Figure 1:
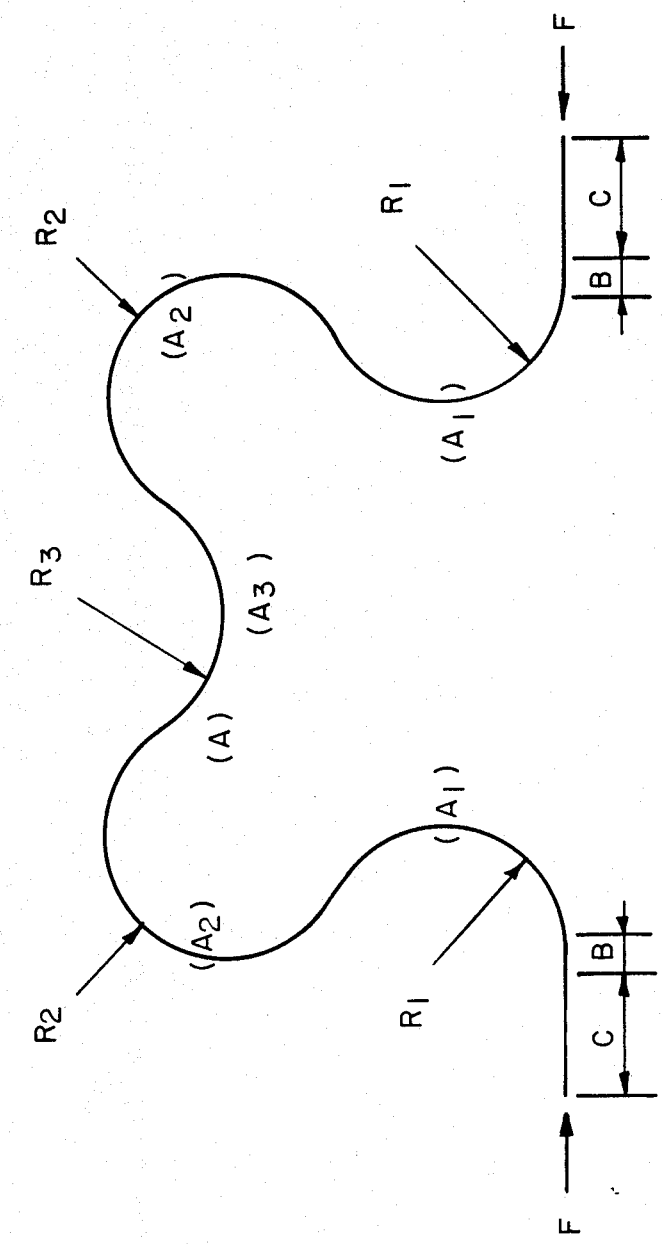

United States Patent [19]

Wang

[11] Patent Number: 4,709,731
[45] Date of Patent: Dec. 1, 1987

[54] FLEXIBLE ELEMENT OF (DUAL) WAVE CREST

[76] Inventor: Liang Wang, No.: 49 Defengxixiang, Qianmen, Chongwen Dis., Beijing, China

[21] Appl. No.: 841,493

[22] Filed: Mar. 10, 1986

[30] Foreign Application Priority Data

Apr. 1, 1985 [CN] China ................................. 85100678

[51] Int. Cl.$^4$ ........................ F16L 11/11; F16L 11/12
[52] U.S. Cl. ..................................... 138/121; 138/173
[58] Field of Search ............... 138/121, 118, 122, 173, 138/155, DIG. 11; 285/226

[56] References Cited

U.S. PATENT DOCUMENTS 2,876,801  3/1959  November .......................... 138/121
3,315,704  4/1967  Shire .................................. 138/121

Primary Examiner—James E. Bryant, III
Attorney, Agent, or Firm—John J. Byrne; Bradford E. Kile

[57] ABSTRACT

A flexible element of (dual) wave crest concave, it consists of a single or multiple flexible elements, in which the contour of each flexible element is composed of segmental arcs of lower wave trough (Radius=$R_1$), (dual) wave crest (Radius=$R_2$) (where $R_1=R_2$) and upper wave trough (Radius=$R_3$, $R_3=R_1$ or $R_3 \neq R_1$) tangential to each other smoothly. This kind of flexible element distributes stresses and strains uniformly, increases flexibility and can bear greater angular deflection. It can be used as element for sensor, sealing, shock absorber, compensator or expansion joint, being widely applied in the field of automatic control and instrument.

5 Claims, 4 Drawing Figures

FIG. I

FLEXIBLE ELEMENT OF (DUAL) WAVE CREST

This invention relates to a flexible element. It can be used as universal mechanical couplers for sensor, sealing, shock absorber, compensator or expansion joint, being widely applied to devices in automatic control, instrument, power generating machine, chemical refining of petroleum and nuclear energy.

It is well known that the cylindric flexible element now available composed of a single, double or multiple flexible element and its cylindric segments at both ends, as a universal mechanical coupler commonly adapted, still has several disadvantages. For example, the comparatively small forming radius and unevenly distributed stress are likely to cause local stress concentration, resulting in decreasing the fatigue life; The equivalent longitudinal displacement of the ways is comparatively small; The capability of bearing lateral flex is relatively poor, in certain circumstances, it is hard to rely on the elasticity of the flexible element only to compensate the biases in equipment setting up; and it is easy to cause flatting and folding when the angular deflection is relatively large. U.S. Pat. No. 2,876,801: Metal convolution tubing patented Mar. 10, 1959, offered a convolutional, flexible tube structure of dual wave crest, but the crosssectional shape of its trough is different from that of its wave crest and the forming radius of the wave crest is relatively small, the wave trough base is flat; there are connections between straight and arc segments on the crossection contour, causing uneven distribution of stresses in all parts. U.S. Pat. No. 3,315,704: flexible bellows, patented Apr. 25, 1967, also offered bellows of dual wave crest but its forming radius of lower wave trough and wave crest are not equal, there are connections between straight and arc segments on the crossection contour, and the forming radius of lower wave trough is relatively small, resulting in uneven distribution of stresses as well.

In view of the above mentioned practical problems, this invention made a suitable and reasonable improvement on the contour of the flexible element of (dual) wave crest with concave, enabling the stress and stain to be evenly distributed in all parts, when loaded, thus increasing the fatigue life; Observing larger rated displacement, (especially, lateral flex and angular deflection) which would reduce the longitudinal length; Attains the goals of ameliorating the design, lightening the weight, saving the raw materials and reducing the cost.

According to this invention, in the flexible element of (dual) wave crest with concave, the crossectional contour of each flexible element is composed of the segmental arcs of lower wave trough, (dual) wave crest and upper. wave trough, tangential to each other smoothly, (That is, adding one concave, at the wave crest of the general rippled flexible element to form two wave crests and one wave trough, and thereby it is called dual wave crest and upper wave trough for short). Furthermore, the forming radius of lower wave trough, $R_1$ is equal to that of (dual) wave crest, $R_2$ i.e.

$$R_1 = R_2$$

Based on the forming radius of the upper wave trough $R_3$, the crossectional contour of the flexible element of (dual) wave crest with concave can be divided into the following two types:

The first type is that the above mentioned forming radius of lower wave trough $R_1$, forming radius of (dual) wave crest $R_2$ and that of upper wave trough are equal to each other, and all segmental arcs are tangential to each other smoothly, that is $$R_1 = R_2 = R_3$$

The second type is that the above mentioned forming radius of lower wave trough $R_1$ is equal to that of (dual) wave crest $R_2$, but not to that of upper wave trough, and all segmented arcs are tangential to each other smoothly, that is $$R_1 = R_2$$

$$R_3 \neq R_2 \text{ or } R_3 \neq R_1$$

Figure 2:
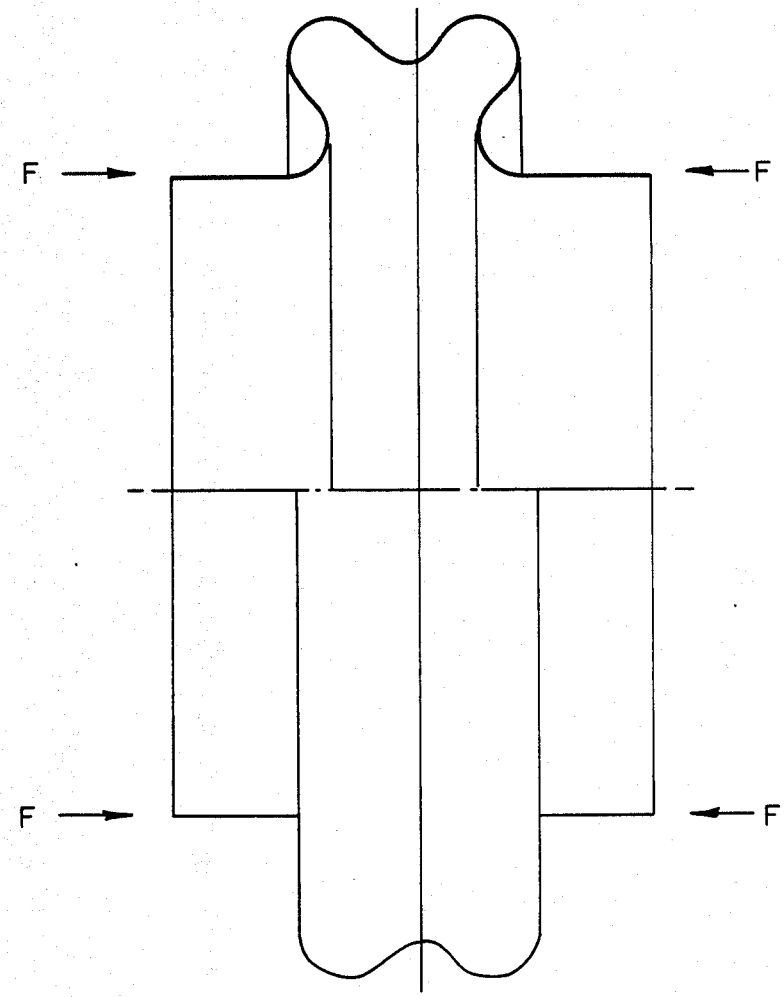

Referring to the attached figures, the practical examples and their advantages are described as follows:

As practical examples, please refer to FIGS. 1 and 2.

FIG. 1 is the crossectional contour of the flexible element of (dual) wave crest with concave of this invention (one flexible unit), FIG. 2 is the profile of the same.

From FIG. 1, it can be seen that the crossectional contour (A) of a flexible unit of this invention (flexible element of dual wave crest with concave) is composed of two lower wave trough arcs $(A_1)$ with radius $R_1$, a (dual) wave crest arc $(A_2)$ with radius $R_2$ and an upper wave trough arc $(A_3)$ with radius $R_3$, tangential to each other smoothly, where $R_1 = R_2 = R_3$. Crossectional contour (A), together with the continuous curve transition segment (B) and cylindric segment (C) at both ends form a complete continuous flexible element.

Usually, longitudinal load F, identical to the cylindric segment, acts tangentially on and transmits to the flexible unit of the crossectional contour of the invention.

Figure 3:
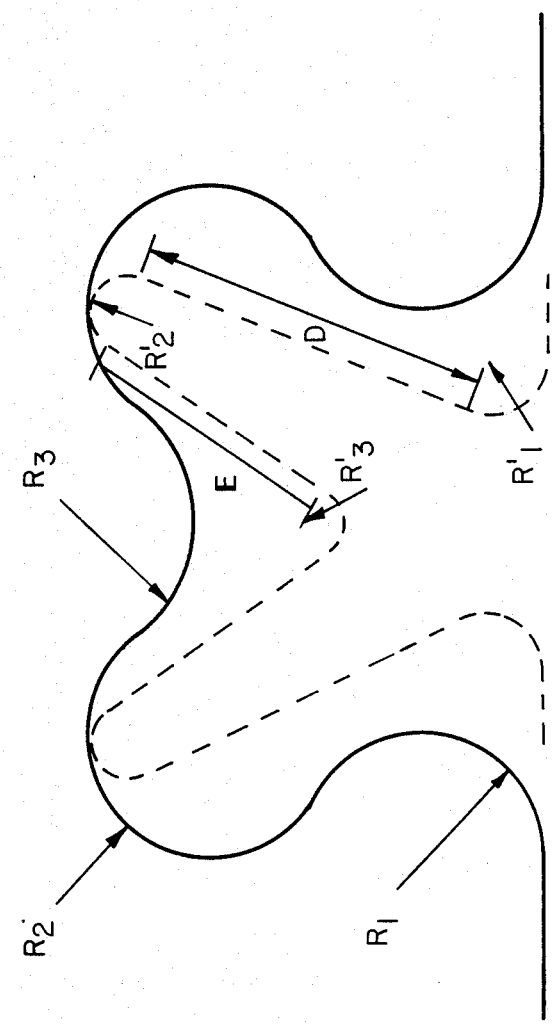
Figure 4:
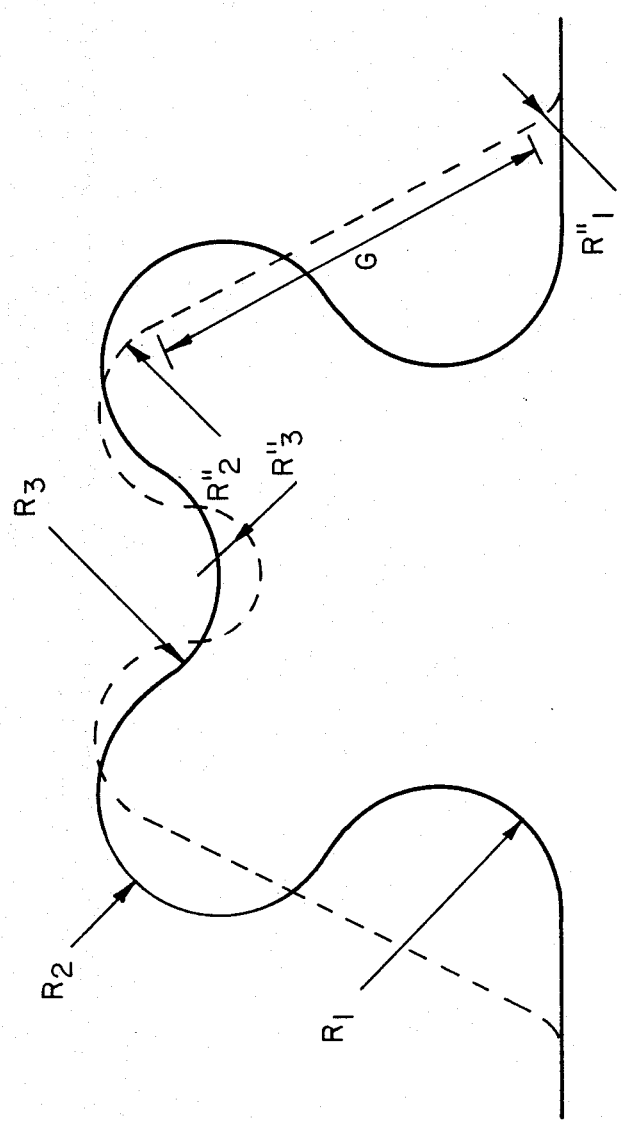

FIGS. 3 and 4 are given to show clearly the advantages of the crossectional contour of the flexible unit of this invention.

FIG. 3 is a comparison of crossectional contours between this invention; flexible unit of (dual) wave crest with concave and U.S. Pat. No. 02,876,801: Metal convolution tubing (Solid line for this invention).

FIG. 4 is a comparison of crossectional contours between this invention: flexible unit of (dual) wave crest with concave and U.S. Pat. No. 3,315,704: Flexible bellows (Solid line for this invention).

From FIGS. 1, 3 and 4, it can be seen that the major differences of the crossectional contours between this invention and the technique now available are as listed in the following table:

| Crossectional contour | Contrast of forming radius of lower wave trough and wave crest | Connection between lower wave trough and wave crest | Connection between wave crest and upper wave trough |
| --- | --- | --- | --- |
| This invention | $R_1 = R_2$ | Tangential connection of equal | Tangential connection of |

| Crossectional contour | Contrast of forming radius of lower wave trough and wave crest | Connection between lower wave trough and wave crest | Connection between wave crest and upper wave trough |
|---|---|---|---|
| U.S. Pat. No. 2,876,801 | $R_{1'} > R_{2'}$ | arcs. Connection of straight segment D. | equal arcs. Connection of straight segment D. |
| U.S. Pat. No. 03,315,704 | $R_{1''} > R_{2''}$ | Connection of straight segment G. | Tangential connection of arcs. |

According to this invention (flexible element of dual wave crest), in every flexible unit, the contour of $R_1=R_2=R_3$ (or $R_1 \approx R_2$, $R_3 \neq R_1$) and with wave crest and wave trough composed of equal arcs connecting tangentially, is formed. Therefore, the following advantages can be expected:

1. Because of the elimination of straight segment connection in the contour, it enables the stresses to be evenly distributed in all parts, resulting in prevention from local stresses concentration and increasing service life;
2. The ability of bearing lateral and longitudinal flex is enhanced;
3. It is not easy to produce flatting or folding under relatively large angular deflection;
4. It can absorb larger rated displacement with a limited length.

I claim:

1. A tubular flexible member comprising:
   a first cylindrical portion;
   a second cylindrical portion; and
   an annular flexible segment interconnecting said first and second cylindrical portions, said annular flexible segment comprising,
   a first annular arcuate portion connected to said first cylindrical portion and being inwardly arcuate with respect to said first and second cylindrical portions and having a radius of curvature of R1,
   a second annular arcuate portion connected to said first annular arcuate portion and being outwardly arcuate with respect to said first and second cylindrical portions and having a radius of curvature of R2,
   a third annular arcuate portion connected to said second annular arcuate portion and being inwardly arcuate with respect to said first and second cylindrical portions and having a radius of curvature of R3,
   a fourth annular arcuate portion connected to said third annular arcuate portion and being outwardly arcuate with respect to said first and second cylindrical portions and having a radius of curvature of R2; and
   a fifth annular arcuate portion connected to said fourth annular arcuate portion and being inwardly arcuate with respect to said first and second cylindrical portions and having a radius of curvature of R1;
   said first, second, third, fourth and fifth annular arcuate portions forming an annular flexible segment having a dual wave crest and wherein the radius of curvature R1 is equal to the said radius of curvature R2.

2. A tubular flexible member as defined in claim 1 wherein:
   the point of connection between said first annular arcuate portion and said second annular arcuate portion is at a location of cotangency with respect to the radius of curvature R1 of said first annular arcuate portion and the radius of curvature R2 of said second annular arcuate portion; and
   the point of connection between said fourth annular arcuate portion and said fifth annular arcuate portion is at a location of cotangency with respect to the radius of curvature R1 of said first annular arcuate portion and the radius of curvature R2 of said second annular arcuate portion.

3. A tubular flexible member as defined in claim 1 wherein:
   the radius of curvature R3 is equal to the radius of curvature of R1 and to the radius of curvature R2.

4. A tubular flexible member as defined in claim 1 wherein:
   the radius of curvature of R3 is greater than the radius of curvature R1 and to the radius of curvature R2.

5. A tubular flexible member as defined in claim 1 and further comprising:
   a first continuous curve transition segment connected between said first cylindrical portion and said first annular arcuate portion; and
   a second continuous curve transition segment connected between said fifth annular arcuate portion and said second cylindrical portion.

* * * * *